United States Patent Office 3,448,782
Patented June 10, 1969

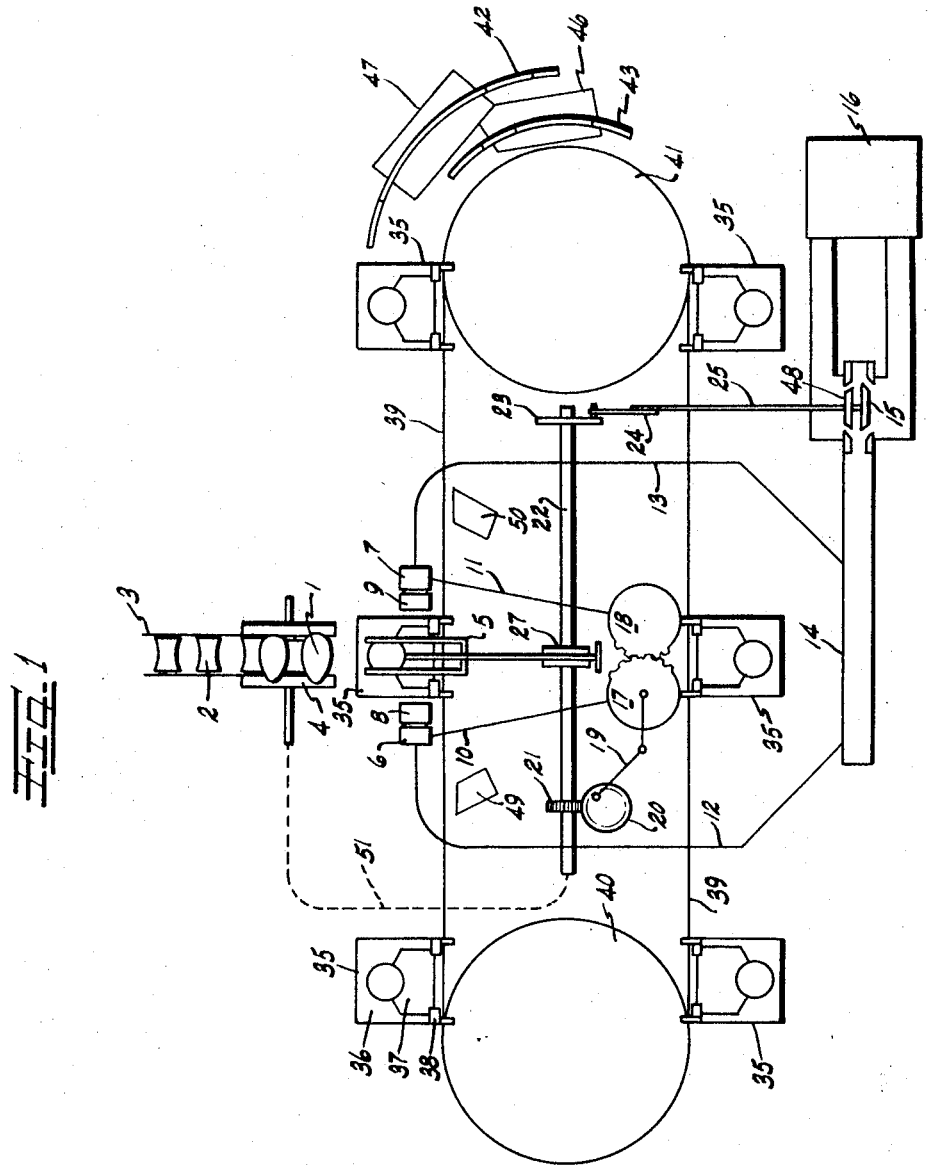

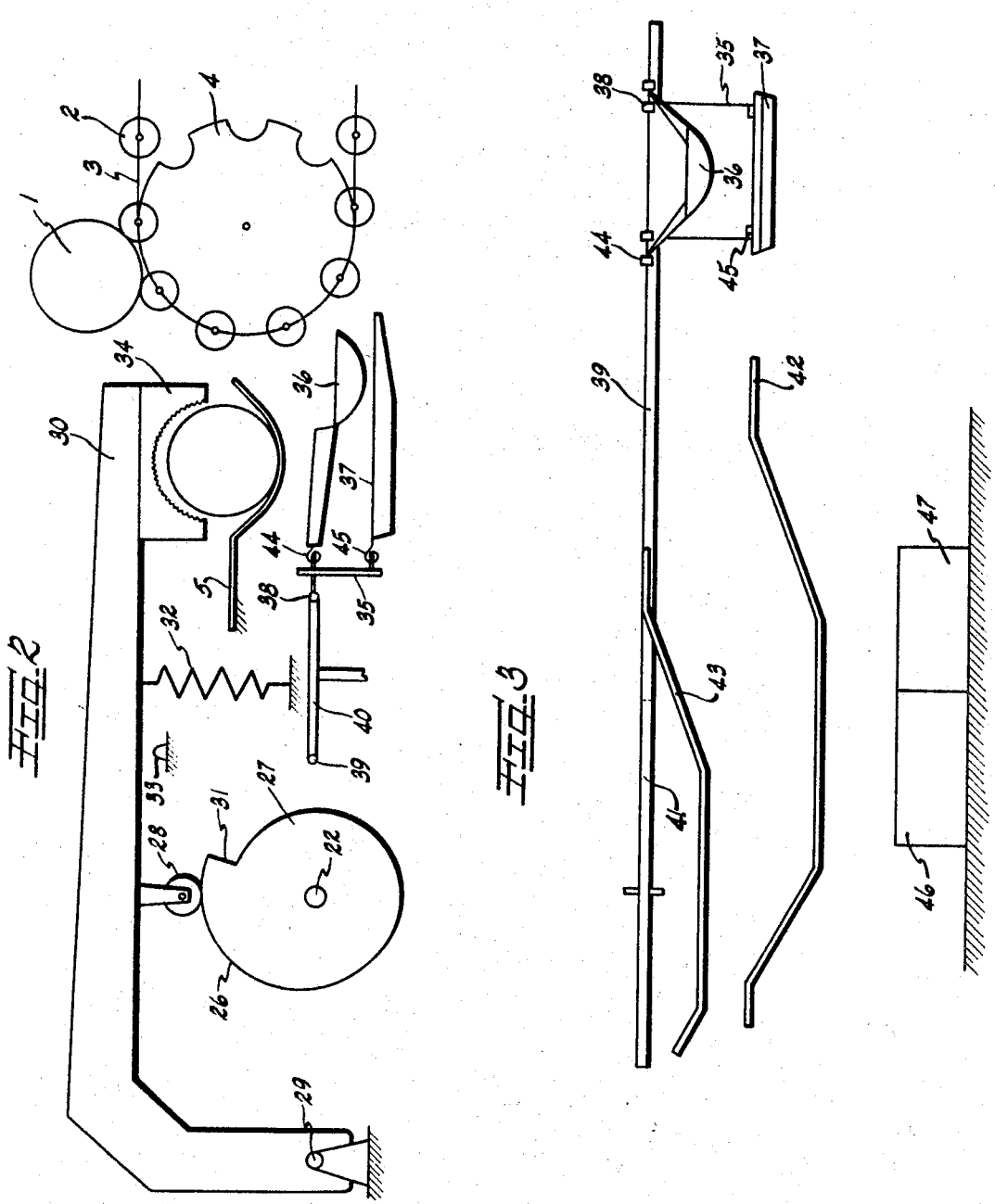

3,448,782
EGG-HANDLING MACHINE
Harry V. Williams, Frankfurt am Main, Germany, assignor to Innovation International, Inc., Chicago, Ill., a corporation of Illinois
Filed Aug. 26, 1966, Ser. No. 575,403
Claims priority, application Germany, Aug. 27, 1965, W 39,816
Int. Cl. A47j 43/14
U.S. Cl. 146—2          6 Claims

ABSTRACT OF THE DISCLOSURE

In an egg-breaking machine, the usual plethora of vacuum cups is eliminated and only a pair of opposed suction cups are used. The suction cups are oscillated and during a portion of this movement are brought into gripping engagement with an egg delivered by a delivery mechanism to a stationary support at an egg-cracking station. The suction cups move away from one another as the egg is cracked and pull the egg shells away from the yoke and albumen which are separated automatically from each other. The suction cups carry the egg shells away and discharge the same.

---

This present invention relates to an egg-handling machine comprising an automatic egg supply and egg-delivery mechanism, egg-receiving suction cups, a cracking knife, and receptacles for the egg contents.

It is generally known to provide an egg-handling machine which includes a pair of rotating turrets on which are arranged egg-receiving suction cups. The turrets are rotatably mounted for movement around horizontal axes and are interconnected by gear wheels. In operation, two vacuum holders are brought to face each other in co-operating relation, thus providing a secure grip of the egg. A cracking knife mounted normal to the long axis of the egg and at a level above the turrets strikes laterally on the gripped egg intermediate the two vacuum cups and thus effects separation of the shell. As the suction cups advance on their rotary path, the egg contents discharge into a receptacle on a conveyor of an egg delivery mechanism. Upon continuing rotation, the sucking action exerted by the two vacuum cups is simultaneously neutralized and the shell halves are discharged.

One problem encountered in an egg-handling machine of this type is that a plethora of vacuum cups is required, which demands exact correlation of the vacuum holders to secure a safe gripping of each egg. Further, considerable elaborate equipment, including air valves, additional nozzles, and conduits is required. In some types of egg-handling machines the rotary forces exerted on the egg cause shattering of the egg shell and thus possible contamination of the contents of the egg.

It is a principal object of the present invention to provide an improved egg-handling machine. A further object is to provide an egg-handling machine of simplified design which is convenient to operate. Another object of the invention is to provide an egg-handling machine which provides for a positive opening of the egg and for discharge of the egg contents into an associated conveying receptacle.

The invention will be apparent from a consideration of the embodiment shown by way of illustration in the appended drawings, wherein:

FIGURE 1 represents a schematic plan view of the egg-handling machine according to the present invention, comprising two vacuum cups, the cracking knife, the egg supply and egg-delivery mechanism, the main drive shaft and the air pressure and air suction system;

FIGURE 2 is a side elevation of the cracking knife, the main shaft, of a receptacle and a portion of the egg supply mechanism; and FIGURE 3 is a front elevation of a receptacle, representing the pivot device for emptying the receptacles and the receptacles respectively receiving the yolk and the albumen.

Generally, and having reference to FIGURE 1, the present invention includes an egg-delivery mechanism, a pair of opposed egg-receiving suction cups 6 and 7, means for reciprocating the suction cups countercurrently on an arcuate path approximately tangent to the long axis of the egg, means for cracking the eggs while held by the suction cups and means for receiving and separating the whites and yolks.

This results in the advantage that instead of a plethora of egg-receiving suction cups only two suction cups are necessary which, being disposed on an arcuate path and operating countercurrently, will neatly open the egg shell upon cracking action of the blade. Owing to the pulling-apart-action applied by the suction cups, the shell is broken up without shattering.

It is a further feature of the present invention that both suction cups are preferably connected to an intermittently operating air pressure and suction device. Thus, the egg is securely grasped on account of the suction effect applied during the striking action of the cracking blade, and the shells are discharged after separation of the egg contents from the egg shell by air pressure.

According to a still further feature of the present invention the cracking knife comprises an arcuate saw-toothed blade as is known per se in the art. This is advantageous inasmuch as the egg shell is not opened in a line, but point-by-point.

According to another feature of the invention, there is provided a main driving shaft for controlling the several elements, the motions of the egg suction cups, the egg feeding and egg-delivery device and of the air pressure and suction device being automatically controlled by said shaft, in a manner known per se, via cam surfaces, gear tooth elements, linkages and valve arrangements. Thus, all elements of the apparatus are advantageously controlled by only one drive in precisely cooperating timed relation.

According to still another feature of the invention, the receptacles of the egg-delivery device for receiving the whites and yolks are detachably secured on a transfer chain by means of a pin connection. This bears the advantage that a receptacle with spoiled egg contents may immediately and, owing to the pin connection, easily be removed and replaced by another clean receptacle.

According to a still further feature of the invention, each suction cup is provided with a flexible air-tight bellows connection intermediate its front and its rear portion. This includes the advantage that a resilient pressure contact bears on the egg, thus preventing injury of the shell.

Referring to the specific embodiment of the invention shown in the drawing, and having reference to FIGURE 1, eggs 1 are advanced on conical rollers 2, which are interconnected by a chain 3 moving step-by-step, to the last roller 4. At this juncture, the eggs drop one by one on a supporting shank 5. Then the cylindrical suction cups 6 and 7 advance cooperatingly towards each other along an arcuate path until they engage against the circumference of the egg. The arcuate motion of the suction cups 6 and 7 is effected by the two levers 10 and 11, the meshing gear tooth elements 17 and 18 connected thereto, the linkage 19 and the two gear wheels 20 and 21, said gear wheel 21 being secured to the main driving shaft 22. This arrangement is schematically illustrated in FIGURE 1.

The above described mechanical arrangement for effecting engagement and disengagement of the suction cups 6 and 7 with the eggs supported on the shank 5 is selected so that the suction cups 6 and 7 reciprocate toward and away from one another along an arcuate path which is substantially tangent to the long axis of the egg when it is supported on the shank 5. The arcuate path may be circular or elliptical as may be desired. For most purposes the arcuate path will be generally circular over the range of movement of the suction cups.

To prevent the movement of the suction cup from bringing pressure to bear on the egg, resilient, accordion-like, air-tight bellows 8, 9 are provided in the vacuum cups, thus effecting a spring-like action. Via the opened valve 15 a vacuum and, in consequence, a suction effect acting on the egg is created in cylinder 14 by the vacuum pump 16, as well as in the resilient conduits 13 and 12 respectively communicating with the suction cups 6 and 7. Here, too, said main drive shaft 22 by cam disk 23 and said linkages 24 and 25 controls the opening of said suction valve 15. The engagement of vacuum holders 6 and 7 against the circumference of the egg and the suction effect produced by said vacuum pump 16 provide for the egg to be neatly and safely gripped.

Referring to FIGURE 2, the cracking knife 30 is pivotably supported at 29. A cam disk 27 comprising the uniformly rising cam section 26, carried by said main driving shaft 22, contacts a roller 28 carried by the cracking knife 30. The cracking knife is lowered by the jog point 31 of cam disk 27 and by spring 32 as to strike the egg supported by the suction cups 6 and 7 and the shank 5. The motion of the cracking knife is intercepted by means of the rubber buffer 33 which is vertically adjustable, the cracking action bearing on the egg thus being controllable and the striking depth, adjustable in accordance with the egg size. By this cracking movement the striking knife 30 cracks the shell egg by means of the arcuate saw-toothed blade 34. As the main drive shaft 22 and, in consequence, gear wheels 21, 20, of linkage 19, said gear tooth elements and said two levers 10 and 11 advance on their path, the vacuum cups 6 and 7 move, under sucking action, on divergent arcuate paths, thus pulling the egg shell in two halves under a slight bending movement which aids in cracking and completely separating the egg shell into two halves. The egg contents discharge into a conveying receptacle disposed beneath the shank 5, the yolk dropping into the trough-like portion 36 and the albumen, owing to its higher specific weight, flowing into the box-like portion 37 of said conveying receptacle 35. Said conveying receptacle is interchangeably secured to a chain 39 by bolts 38. Said endless chain 39, carrying a number of conveying receptacles 35 travels around the two drums 40 and 41, one of the latter being driven step by step by said main driving shaft.

Due to the advance of said chain 39, each filled up conveying receptacle 35 arrives at the pivot device 42 and 43, illustrated in FIGURE 3, which sequentially presses down the box-like portion 37 and the trough or pan-like portion 36 against the bias or springs 44 and 45. Thus the yolk is dumped into receptacle 46 and the white of the egg, into receptacle 47. Past the reach of said pivot device, both portions of the conveying receptacle under action of springs 44 and 45 return to their normal position and are again ready for receiving further egg contents.

As the main driving shaft continues its revolution, suction valve 15 closes by means of cam disk 23 and said linkages 24 and 25, simultaneously opening the pressure valve 48. The vacuum pump will now press air through cylinder 14 and the two resilient conduits 12 and 13 into the widely spaced apart vacuum cups, thus dumping the shell halves in containers 49 and 50.

Over the resilient shaft 51, said main driving shaft 22 controls the advance of the terminal roller 4, a further egg thus arriving at the supporting shank 5.

Although certain embodiments of the apparatus have been described in detail, alternative embodiments within the skill of the art are contemplated.

Various features of the invention are set forth in the following claims.

What is claimed is:

1. An egg-handling machine comprising: support means for holding an egg during cracking, means for delivering and depositing eggs on said support, an oscillating means having a pair of opposed suction cups for engaging opposite ends of the egg on said support, means for selectively creating a vacuum in said suction cups, means for pivoting said suction cups toward each other along an arcuate path to a position approximately tangent to the long diameter of the egg to grip said egg after deposition on said support prior to cracking said egg and to pivot said suction cups in a reverse movement away from each other to an egg shell release position, means for cracking the egg while on said support and gripped by said suction cups, and means for receiving the contents of the eggs.

2. An apparatus in accordance with claim 1 wherein the means for receiving the contents of the eggs includes means for separating the whites and yolks, said machine including a pivot device for selectively discharging the separated whites and yolks.

3. An apparatus in accordance with claim 2 wherein the means for receiving the contents of the eggs are detachably supported on an endless conveyor.

4. An apparatus in accordance with claim 1 wherein means are provided for selectively supplying air pressure to said suction cups.

5. An apparatus in accordance with claim 1 in which said support means is stationary and an egg is placed thereon by said delivery means prior to the gripping thereof by said opposed suction cups.

6. An apparatus in accordance with claim 7 in which the means for cracking said egg includes a knife movable along a downward path to engage the top of the egg while on said stationary support and to crack the same as said suction cups pivot outwardly away from each other in a plane substantially perpendicular to the path of movement of the knife.

References Cited

UNITED STATES PATENTS 2,177,967 10/1939 Watkins.
2,771,926 11/1956 Willsey.
2,813,800 11/1957 Rasky.
2,932,825 4/1960 Vaughan.
2,966,184 12/1960 Willsey.

W. GRAYDON ABERCROMBIE, *Primary Examiner*.

UNITED STATES PATENT OFFICE
CERTIFICATE OF CORRECTION

Patent No. 3,448,782                                                June 10, 1969

Harry V. Williams

It is certified that error appears in the above identified patent and that said Letters Patent are hereby corrected as shown below:

Column 4, line 47, the claim reference numeral "7" should read -- 5 --.

Signed and sealed this 21st day of April 1970.

(SEAL)
Attest:

Edward M. Fletcher, Jr.                              WILLIAM E. SCHUYLER, JR.
Attesting Officer                                             Commissioner of Patents